United States Patent
Sampat (10) Patent No.: US 10,247,519 B2
(45) Date of Patent: Apr. 2, 2019

(54) METHODS AND APPARATUS FOR CONTROLLING LINE OF SIGHT DRIFT

(71) Applicant: Raytheon Company, Waltham, MA (US)

(72) Inventor: Nayan D. Sampat, Bellflower, CA (US)

(73) Assignee: Raytheon Company, Waltham, MA (US)

( * ) Notice: Subject to any disclaimer, the term of this patent is extended or adjusted under 35 U.S.C. 154(b) by 17 days.

(21) Appl. No.: 15/590,335

(22) Filed: May 9, 2017

(65) Prior Publication Data
US 2018/0328697 A1 Nov. 15, 2018

(51) Int. Cl.
| | | |
|---|---|---|
| *F41G 3/06* | (2006.01) | |
| *F41G 3/08* | (2006.01) | |
| *F41G 3/16* | (2006.01) | |
| *F41G 3/22* | (2006.01) | |
| *F41G 5/24* | (2006.01) | |
| *F41A 27/30* | (2006.01) | |
| *G02B 23/12* | (2006.01) | |
| *G02B 27/64* | (2006.01) | |

(52) U.S. Cl.
CPC ............... *F41G 5/24* (2013.01); *F41A 27/30* (2013.01); *F41G 3/08* (2013.01); *F41G 3/165* (2013.01); *F41G 3/22* (2013.01); *G02B 23/12* (2013.01); *G02B 27/644* (2013.01); *F41G 3/06* (2013.01)

(58) Field of Classification Search
None
See application file for complete search history.

(56) References Cited

U.S. PATENT DOCUMENTS

| | | | |
|---|---|---|---|
| 6,069,656 | A | 5/2000 | Silver |
| 6,166,362 | A | 12/2000 | Shon et al. |
| 6,683,543 | B1 | 1/2004 | Yeo |
| 6,903,720 | B1 | 6/2005 | Glithero |
| 6,936,801 | B1 | 8/2005 | Head |
| 7,693,292 | B1 | 4/2010 | Gross et al. |

(Continued)

FOREIGN PATENT DOCUMENTS

| | | |
|---|---|---|
| DE | 10 2014 117 277 A1 | 5/2016 |
| WO | WO 2008/142692 A2 | 11/2008 |

OTHER PUBLICATIONS

PCT International Search Report and Written Opinion dated May 3, 2018 for International Application No. PCT/US2018/014618; 13 Pages.

(Continued)

*Primary Examiner* — Kristy A Haupt
(74) *Attorney, Agent, or Firm* — Daly, Crowley, Mofford & Durkee, LLP (57) ABSTRACT

Described embodiments provide methods and apparatus for adjusting a line of sight to a target to compensate for drift. Embodiments can include an optical assembly configured and arranged for viewing an area including the target, a display window for viewing a line of sight to the target, one or more manual operator controls connected to a digital processor configured to adjust offsets to the line of sight, an automatic operating mode configured to automate adjusting the offsets to correct for drift bias of the line of sight to the target, and an operator control switch configured to switch the system between the automatic mode and a manual mode.

20 Claims, 8 Drawing Sheets

(56) References Cited

U.S. PATENT DOCUMENTS

2009/0266892 A1* 10/2009 Windauer ............... F41G 1/38
 235/404
2009/0283598 A1* 11/2009 Sherman ............. G06K 9/3216
 235/404

OTHER PUBLICATIONS

ADIS16136 Datasheet; "Precision Angular Rate Sensor"; Analog Devices; 2011-2014; 21 Pages.
3DM-GX3-25 Datasheet; "Attitude Heading Reference System"; Lord MicroStrain Sensing Systems; Revision No. 3; 2014; 2 Pages.

* cited by examiner

METHODS AND APPARATUS FOR CONTROLLING LINE OF SIGHT DRIFT

BACKGROUND

Targeting systems for weapons in vehicles, such as tanks, require a high level of efficiency in adapting to frequently changing conditions. Environmental conditions, including temperature, visibility, daylight, and road conditions, for example, can effect the electronic and mechanical systems that operate the targeting system and can cause bias or drift with the electronic and mechanical systems that align the line of sight to the target. A certain level of automatic stabilization can assist with maintaining steady targeting, however, some level of drift may persist. Existing systems may have manual adjustment controls for azimuth and elevation offsets, for example, to adjust a line of sight. A line of sight may be represented by a cross hair overlay, for example, within a target viewing window. An operator can quickly change the scale of viewing and adjustment of targeting control. Direct and continuous analog-based signals between the adjustment controls and targeting system have been the adopted mode of interaction and communication within such systems. However, such systems can suffer from noise and interference and may lack the ability to efficiently manage the transfer of data and control between different drift adjustment modes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, a system for adjusting a line of sight to a target in an image comprises: an optical assembly having a field of view from which the image is generated; a display window for viewing a line of sight to the target in the image; a controller configured to operate in an automatic mode for automatically adjusting offsets to a drift in the line of sight to the target in the display window, and in a manual mode to receive operator adjustments to the offsets; one or more first manual operator controls connected to a digital processor configured to adjust the offsets for the drift in the line of sight in the manual mode; an operator control switch configured to switch the system between the automatic mode and the manual mode; and a mode indicator o indicate whether the automatic mode or manual mode is selected.

An example system can further include one or more of the following features: the offsets are adjusted with digitally incremented values, the system further comprising second one or more manual operator controls configured for changing a scale of the digitally-incremented values, the second one or more manual operator controls for changing the scale include one or more operator controls to adjust a portion of a FOV displayed as an image in the display window, the system reverts to the manual mode after the automatic mode completes an alignment of the line of sight, the system is further configured to detect errors or faults during adjustment of the offsets, the first one or more manual operator controls comprise azimuth and elevation offset controls, the first and second one or more manual operator controls comprise dials, push buttons, and/or joysticks, optical configurations adapted for daytime and nighttime viewing, a display status for the operator that includes range to the target, and/or non-volatile memory configured to store and restore the offsets.

In another aspect, a method for adjusting a line of sight to a target in an image comprises: providing a display window for viewing a line of sight to the target in the image; providing first one or more manual operator controls connected to a digital processor configured to adjust offsets to the direction of the line of sight; providing a manual mode of operation to enable the operator to adjust the offsets to the direction of the line of sight by manually adjusting the first one or more manual operator controls; receiving user inputs to switch between the manual mode and an automatic mode configured to automatically correct for drift of the line of sight with the target in the image; and providing a mode indicator to indicate whether the automatic mode or manual mode is selected.

An example method can further include one or more of the following features: providing second one or more manual operator controls for changing a scale of the offsets, the offsets adjusted with digitally incremented values, the first one or more manual operator controls comprise azimuth and elevation offset controls, the second one or more manual operator controls comprise controls for switching between a daytime view and a thermal imaging view, and/or the second one or more manual operator controls comprise controls for saving and restoring saved offsets to the line of sight.

In a further aspect, at least one non-transitory machine readable medium comprising instructions that, when executed by the machine, enable the machine to perform: graphically rendering a line of sight to a target in an image in a display for viewing the image; receiving incremental adjustments to digital offset values from the manual manipulation of operator controls and correspondingly offsetting a drift of the graphically rendered view of the line of sight to the target in the image; receiving a signal that places the machine in an automatic mode to automatically adjust the offset values; and receiving a signal to switch from the automatic mode into a manual mode permitting manual manipulation of operator controls to manually adjust the offset values.

An example machine readable medium can include instructions one or more of the following features: receiving instructions for changing the scale of incremental adjustments to the digital offset values; and changing the scale of incremental adjustments to the digital offset values, the digital offset values comprise azimuth and elevation offsets to the drift of the line of sight to the scene, instructions for adjusting a portion of a FOV displayed as an image in the display window, and/or the system reverts to the manual mode after the automatic mode completes an alignment of the line of sight.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. Furthermore, the drawings are not necessarily to scale, emphasis instead being placed on the concepts disclosed herein.

DETAILED DESCRIPTION

Described embodiments are directed to control and management of manual and automatic modes of controlling line of sight targeting systems to adjust for line of sight drift. In particular, embodiments include manual controls that adjust digital offsets and other settings that can be stored to non-volatile memory and configured to reload and operate during initialization and transitions between manual and automatic modes of operation.

Figure 1A:
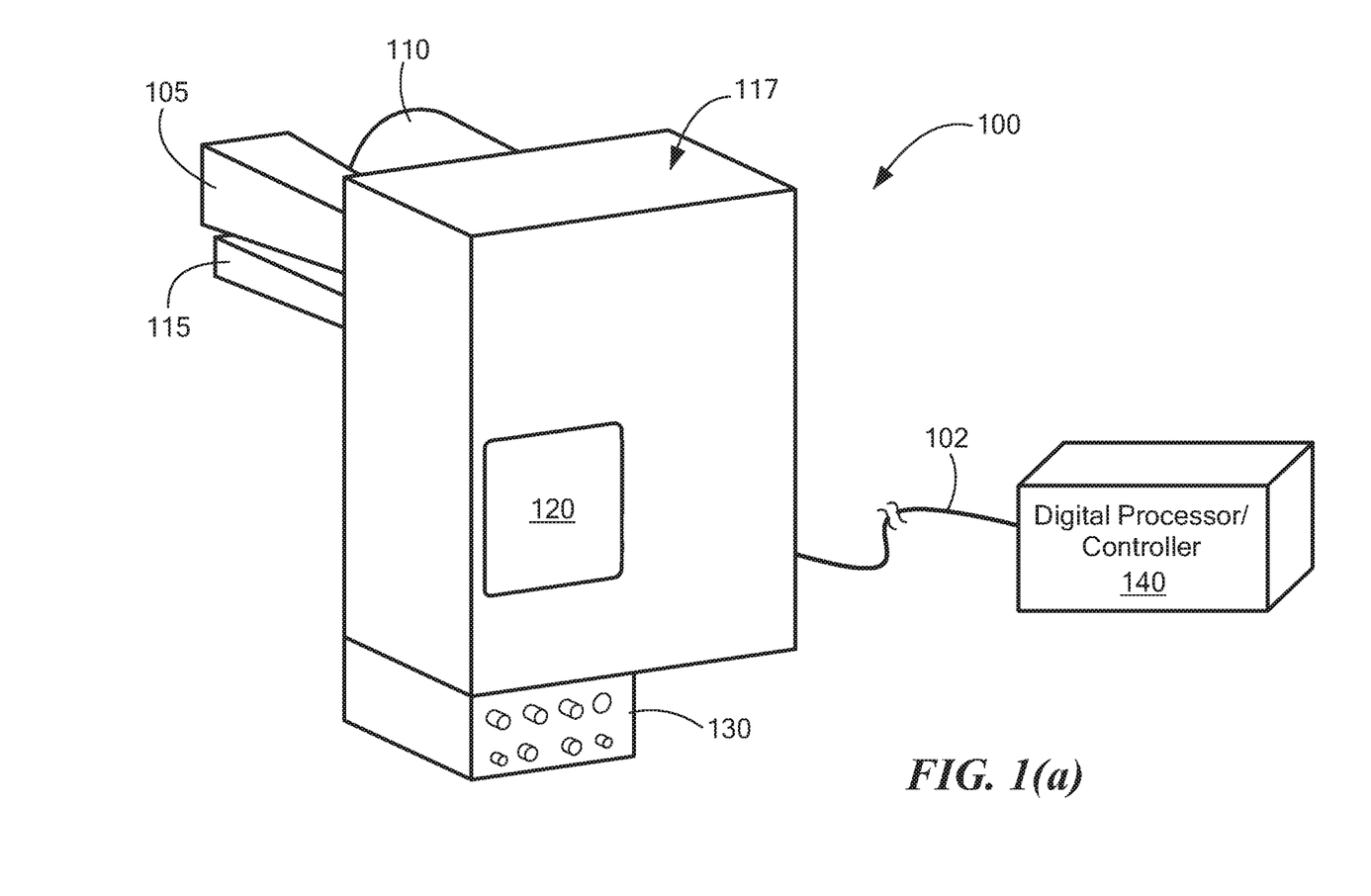
FIG. 1(a) is an isometric view of an illustrative line of sight system in accordance with described embodiments.

Referring to FIG. 1(a), an isometric view of an illustrative line of sight system 100 in accordance with described embodiments is provided. In embodiments, the line of sight system 100 can be installed in a vehicle from which projectiles can be launched at targets. At a given time, the line of sight system 100 has a field of view (FOV) from which an image can be provided on a display for a user. The image can include a target to which a line of sight can be focused. In embodiments, an operator can correct for drift (unintended/undesired movement) of a line of sight to the target. In embodiments, a fire control system can automatically manipulate portions of the vehicle to remain on the selected target while the vehicle moves. For example, an inertial guidance system, which can include a series of gyros, can detect vehicle line of sight angular velocity and acceleration. Embodiments of the invention can enable an operator to adjust for drift in the inertial guidance system due to temperature change, inherent sensor inaccuracies, electronic circuit limitations, and the like, by using the line of sight system 100.

In embodiments, line of sight system 100 includes a gyro stabilized optical assembly 117 having day vision optics 105 for eye visible imagery, a laser bundle 115 for ranging, and thermal imaging optics 110 for operation during day and/or night time modes of operation. A sighting display window 120 provides an image generated from the FOV of the gyro stabilized optical assembly. Line of sight system 100 steer vision optics 105, thermal imaging optics 110, and laser bundle 115 move together via gyro stabilized assembly 117 for coordinated, stabilized line of sight movement.

Figure 2A:
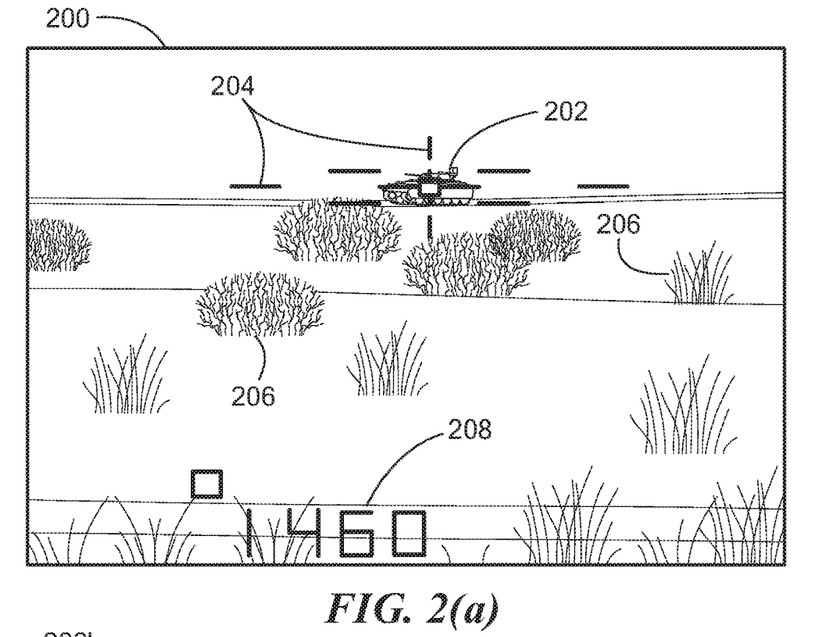
FIG. 2(a) is a view of an illustrative sighting window showing an image having a target and a graphical line of sight to the target in accordance with described embodiments.
Figure 2B:
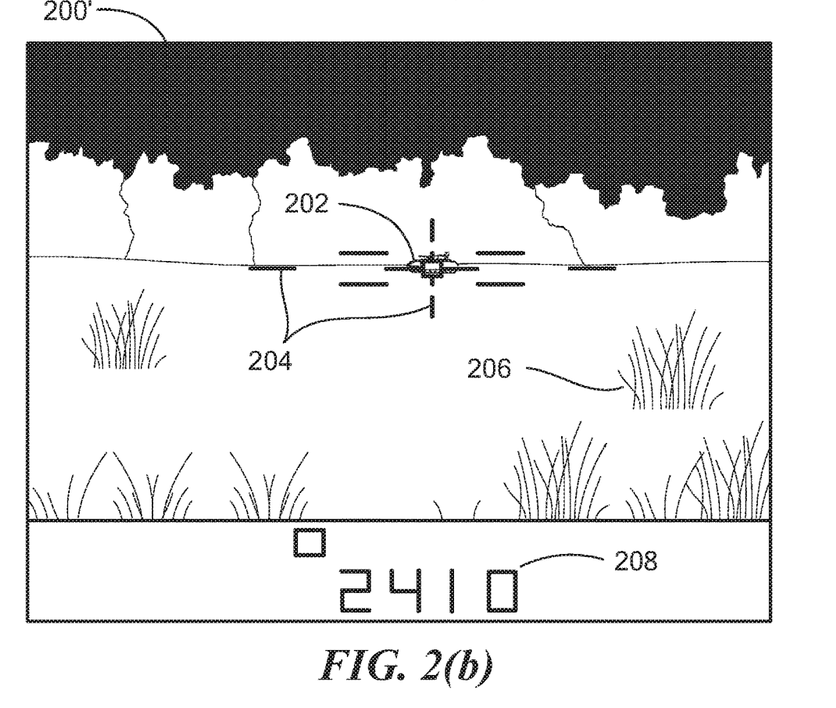
FIG. 2(b) is a view of an illustrative sighting window showing an image having a target through a night vision system and a graphical line of sight to the target in accordance with described embodiments.

FIGS. 2(a) and 2(b)) show respective images 200, 200' that can be seen on the display window 120 (FIG. 1(a)). FIG. 2(a) shows a target 202 with an overlay 204, shown as cross hairs, that define a line of light to the target 202. In the illustrated image, the target 202 is shown in addition to various vegetation 206. A readout 208 shows the current range of the target. FIG. 2(a) shows a day time image 200 and FIG. 2(b) shows a night time image 200' for a similar FOV using a night vision system. In various embodiments, an operator can switch between daytime and nighttime viewing modes. When such switching is performed, embodiments permit previously used settings to be maintained between modes.

In embodiments, drift refers to relatively slow movement of the image 200 or 200' in the display window 120 including movement of the target 202 away from the cross hairs 204. During a typical scenario in which drift may be corrected/compensated, an operator can focus the cross hairs on a stationary target (e.g., a tree) in the image and observe whether the target drifts from the cross-hairs. In embodiments, the operator can perceive the image/target slowly drifting in the display for which azimuth and/or elevation offsets can be adjusted to compensate for the drift. If such drift occurs, the operator can use one or more of the manual operator controls described above in connection with drift FIGS. 1(a)-1(c) to adjust the drift offsets (e.g., azimuth, elevation) until such motion is minimized or ceases. In automatic mode, system 100 can automatically adjust the drift offsets as described further herein with respect to described embodiments.

Referring again to FIG. 1(a), a controller/digital processor 140 provides instructions/programming to manage control of a line of sight to the target 202 (FIG. 2(a). In embodiments, the controller/digital processor 140 includes a manual mode of operation and an automatic mode of operation. A user can manipulate manual operator controls on a control panel 130 to compensate for line of sight drift. The automatic mode (or automatic drift mode) can automatically adjust line of sight drift offsets to correct for drift.

In embodiments, settings controlled by the manual operator controls and the controller 140 in automatic mode can include azimuth and elevation adjustments/offsets to the line of sight. In an embodiment, the settings are communicated and stored as digital values. In an embodiment, the manual operator controls include controls for changing between various optical configurations including, for example, the FOV of the image on the display window 120 (e.g., by zooming in or out) or switching between daytime and nighttime viewing modes with day vision optics 105 or thermal imaging optics 110, respectively.

In embodiments, scale factors are used to process the FOV of the optics system and provide an image on the display window 120 that appears to be zoomed in/out. For example, one scale factor setting can correspond to the entire FOV shown as the image on the display window 120 and a different scale factor setting can correspond to a portion of the FOV as the image in the display window to enable the user to 'zoom in' on a particular portion of the FOV. In described embodiments, manual operator controls can be utilized to switch between various preset configurations including, for example, configurations of a preset FOV scale (e.g., for close, mid, or far range viewing). In embodiments, the digital processor/controller 140 communicates with other components of system 100 by way of a communication interface 102 which can include, for example, electronic or fiber optic cables, wireless adapters, and/or radiofrequency communication systems and the like.

Figure 1B:
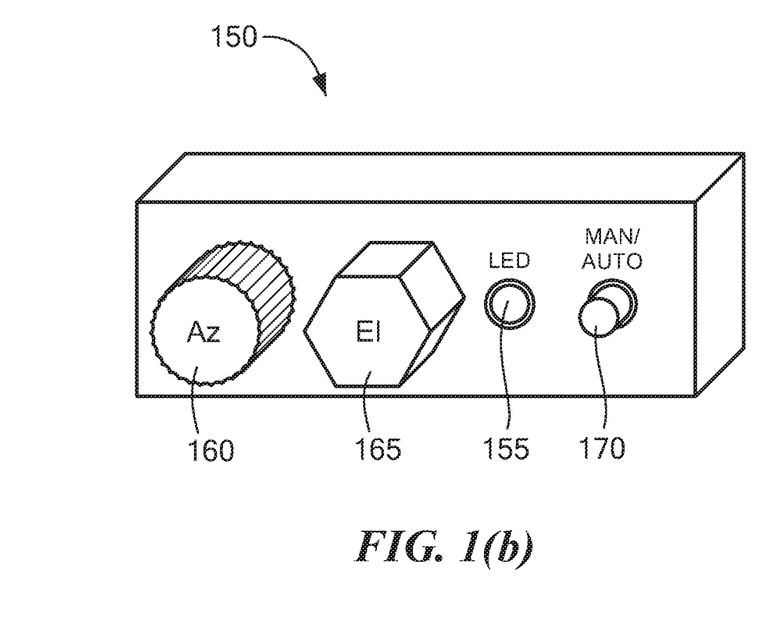
FIGS. 1(b) and 1(c) are isometric views of illustrative control and indicator panels for a line of sight system in accordance with described embodiments.

Referring to FIG. 1(b), an exemplary operator control and indicator panel 150 is illustrated that may be part of the control panel 130 of FIG. 1(a). The indicator panel 150 includes azimuth offset control knob 160 and elevation offset control knob 165 for manual adjustment of azimuth and elevation, such as in response to operator observed drift, according to an embodiment of the invention. In an embodiment, the control knobs 160, 165 enable digital adjustment of azimuth and elevation but can simulate the look, feel, and rotational resistance of traditional analog drift correction controls. An operator control switch mechanism 170, such as a switch, push button, momentary or latching switch, for example, can enable a user to switch between manual and automatic (drift correction) modes (further described, for example, with respect to the automatic mode initiated at block 530 of FIG. 5) and an indicator 155, such as an LED, can indicate whether manual or automatic mode is activated. In various embodiments, other types of indicators can be used including text and/or symbol displays.

Figure 1C:
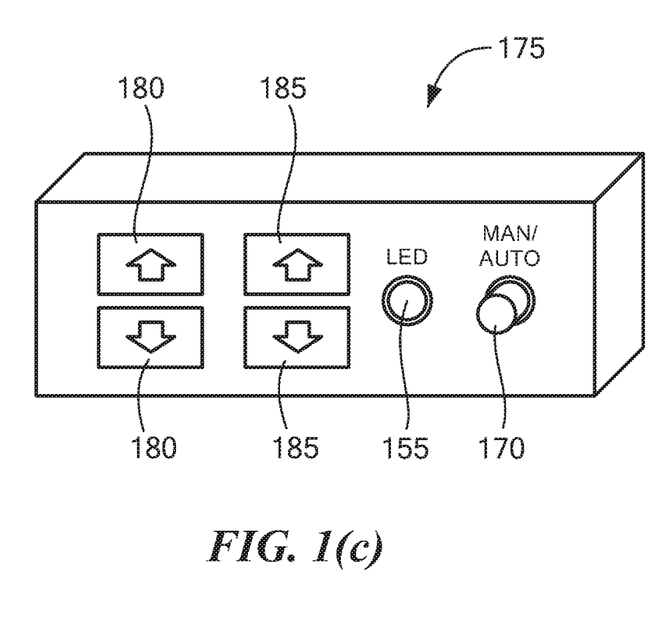

Referring to FIG. 1(c), another embodiment of a control and indicator panel 175 includes up/down buttons 180 and 185 for increasing/decreasing azimuth and elevation offset settings. In various embodiments, manual operator controls including, for example, dials, push buttons, and joysticks can be utilized. In other embodiments, azimuth and/or elevation offsets can be adjusted via a touch sensitive display, for example.

Figure 3:
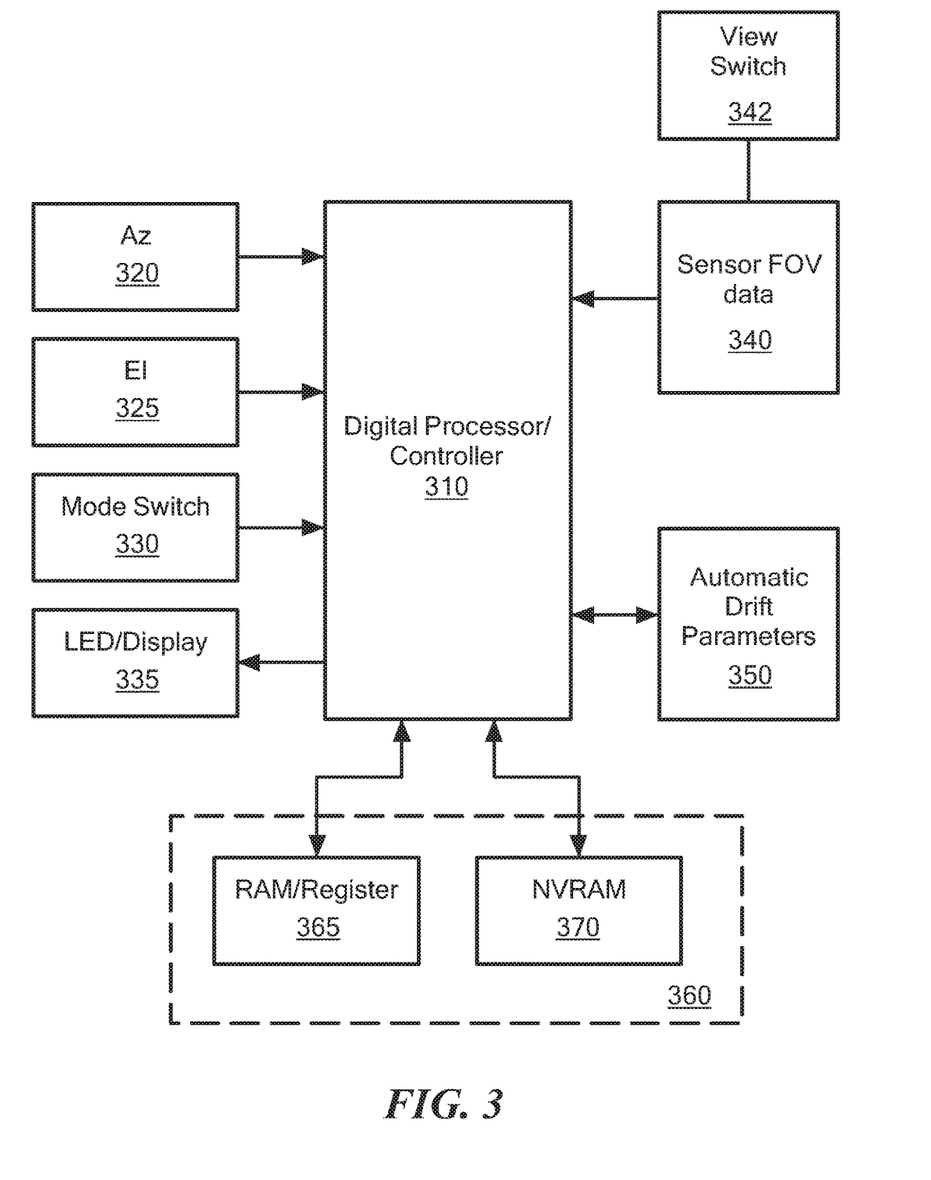
FIG. 3 is a block diagram illustrating a line of sight system in accordance with described embodiments.

Referring to FIG. 3, an illustrative block diagram of a line of sight system in accordance with described embodiments is provided. A controller 310 receives and processes operator commands including, for example, azimuth drift offset represented by block 320 and elevation drift offset represented by block 325. These offsets can be manually adjusted by the operator, such as described above in reference to FIGS. 1(a)-1(c), to adjust a line of sight drift such as represented by the cross hairs 202 of FIG. 2(a) and FIG. 2(b). In an embodiment, the offset values are processed by the controller 310 as digital values, which in turn adjusts a line of sight (e.g., as shown if FIGS. 2(a)-2(b)) by applying angular velocity adjustments to the line of sight according to the drift offset values.

A mode switch 330 operated by a user sends a signal and instructs the digital processor/controller 310 to switch the line of sight system between a manual mode and automatic (drift) mode. In manual mode, an operator can directly change offset values, such as described above. In automatic mode, the controller 310 can adjust the line of sight angular velocity offsets automatically such as by way of controller programming that analyzes and processes images of targets in the line of sight view (e.g., such as shown in FIGS. 2(a)-2(b)). Automatic mode (or drift) parameters, states, and/or programming is represented by block 350, which are communicated to controller 310. Such parameters, states and/or programming can include, for example, image processing, sensitivity settings, vehicle mode management, servo loop modes, faults, etc. In embodiments, the parameters and programming can be communicated into the system by external data storage devices and/or networks (e.g., computer readable disks, wireless communications, etc.). A transition signal from the mode switch 330, which can be manually initiated by an operator such as by utilizing switch 170 or after automatic mode has completed while in a "latching" mode described below, will signal the controller 310 to cease automatically adjusting the offsets to the line of sight and give offset adjustment control back to an operator in manual mode, as described above.

In embodiments, offsets and other settings are maintained in memory represented by block 360. In an embodiment, real-time adjustments to offsets are stored in transitory RAM/registers represented by block 365. In an embodiment, offsets and other settings that are stored for future use after shutting down or resetting the system) can be stored in non-volatile RAM as represented by block 370.

In embodiments, different images (e.g., sizes/resolution of fields of view (FOV), daytime/nighttime modes) can be selected for display during operation. For example, if a target is far away, an operator may want to narrow the FOV. Or, depending on ambient light and visibility, an operator may select a night time mode (see, e.g., FIG. 2(b)) utilizing thermal imaging (e.g., FLIR). Additional parameters may include brightness and contrast, for example, and associated settings. Communication of the selected viewing mode and field of view to the controller 310 is represented by block 340. In embodiments, a view switch 342 can be manipulated by a user to select the viewing mode, e.g., day time mode, night time mode, etc.

In an embodiment, controller 310 controls/communicates display information/data to an operator display represented by block 335. Such information/data can include the image overlays of a line of sight cross hair overlay 200 or LED displays, such as shown in FIGS. 2(a)-2(b).

Figure 4:
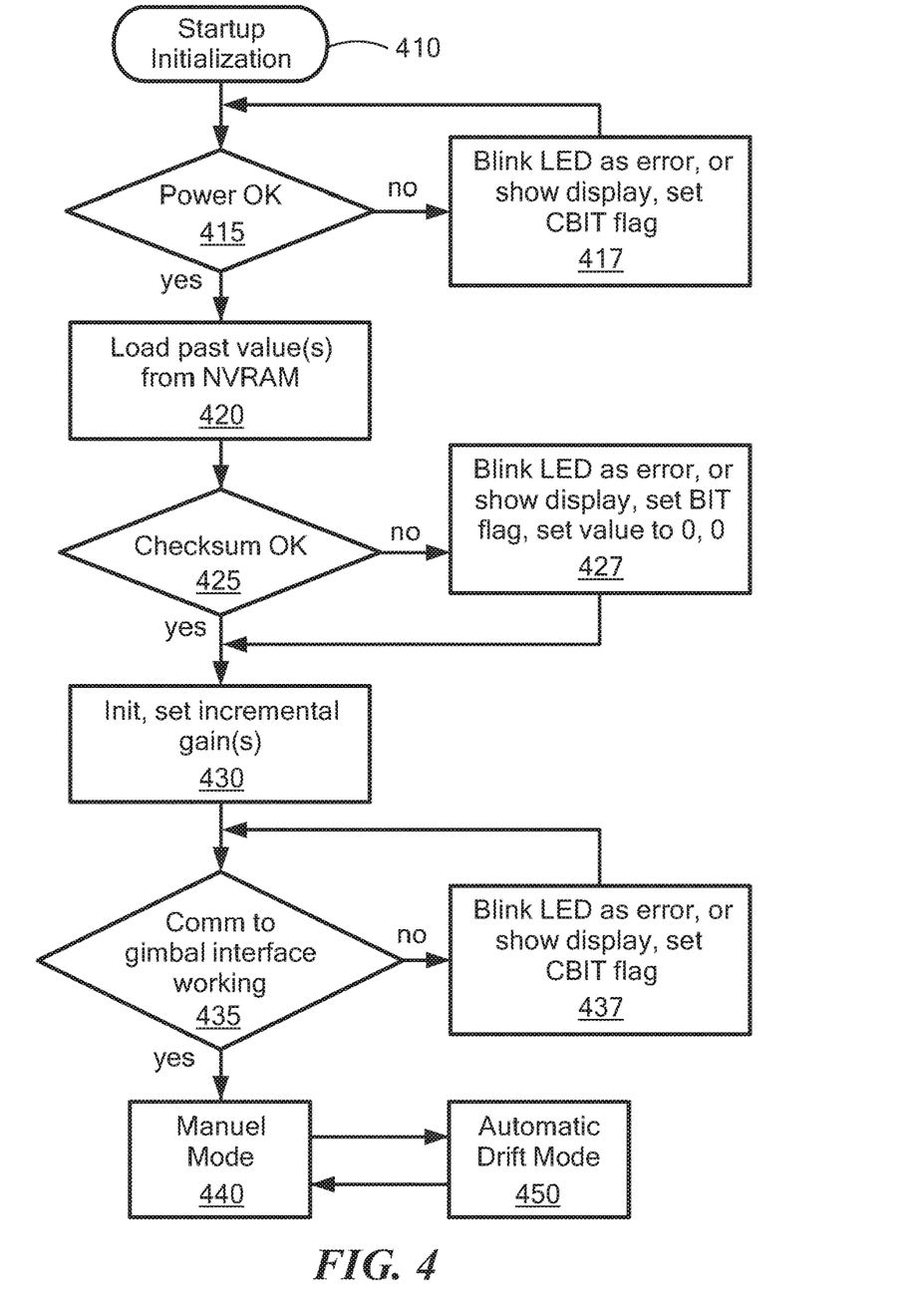
FIG. 4 is a flow diagram illustrating an initialization and startup process in accordance with described embodiments.

Referring to FIG. 4, a flow diagram illustrating an initialization and startup process in accordance with described embodiments is provided. Initialization starts at block 410 after which a confirmation of power is performed at block 415. If proper power is not detected in the system, an operator notification, such as by a visual indicator at block 417, is activated, a power failure or Continuous Built in Test (CBIT) flag in the system is set, for example, in memory/registers 365, and the system repeats the power check at block 415 until proper power is confirmed.

When sufficient power to the system is confirmed, in embodiments, stored system settings (e.g., azimuth and elevation offsets) as described herein are loaded from NVRAM 370 (FIG. 3) at block 420. An error check (e.g., a checksum) of the stored settings is performed at block 425. If an error is detected, an operator signal is activated and, in an embodiment, the settings are reset to default values (e.g., zeroed) at block 427 before initialization continues at block 430 where further initialization occurs utilizing the loaded and/or default settings, such as setting the initial azimuth/elevation offset values, gain increments of operator controls, and/or other settings that can also be stored and loaded with NVRAM 370.

At block 435, a check is performed of a communication interface to the gyro stabilized optical assembly 117 (FIG. 1), which can maintain accuracy of a line of sight, and the digital controller 140. If the gyro stabilized assembly interface check does not confirm operation or reflects an error, an operator signal can be activated and a system or CBIT flag set at block 437 until the interface is confirmed to be operating correctly. It is understood that the gyro stabilized optical assembly can form part of gyroscope-based inertial targeting system. For example, a gyroscope can be mounted in gimbals, which provide support to enable sensing of various rotational axis.

After completion of various initialization and error checks is performed, the system can begin a manual mode offset operation at block 440 such as described herein. As described in embodiments above and below, the system can switch between the manual mode and an automatic mode at block 450.

Figure 5:
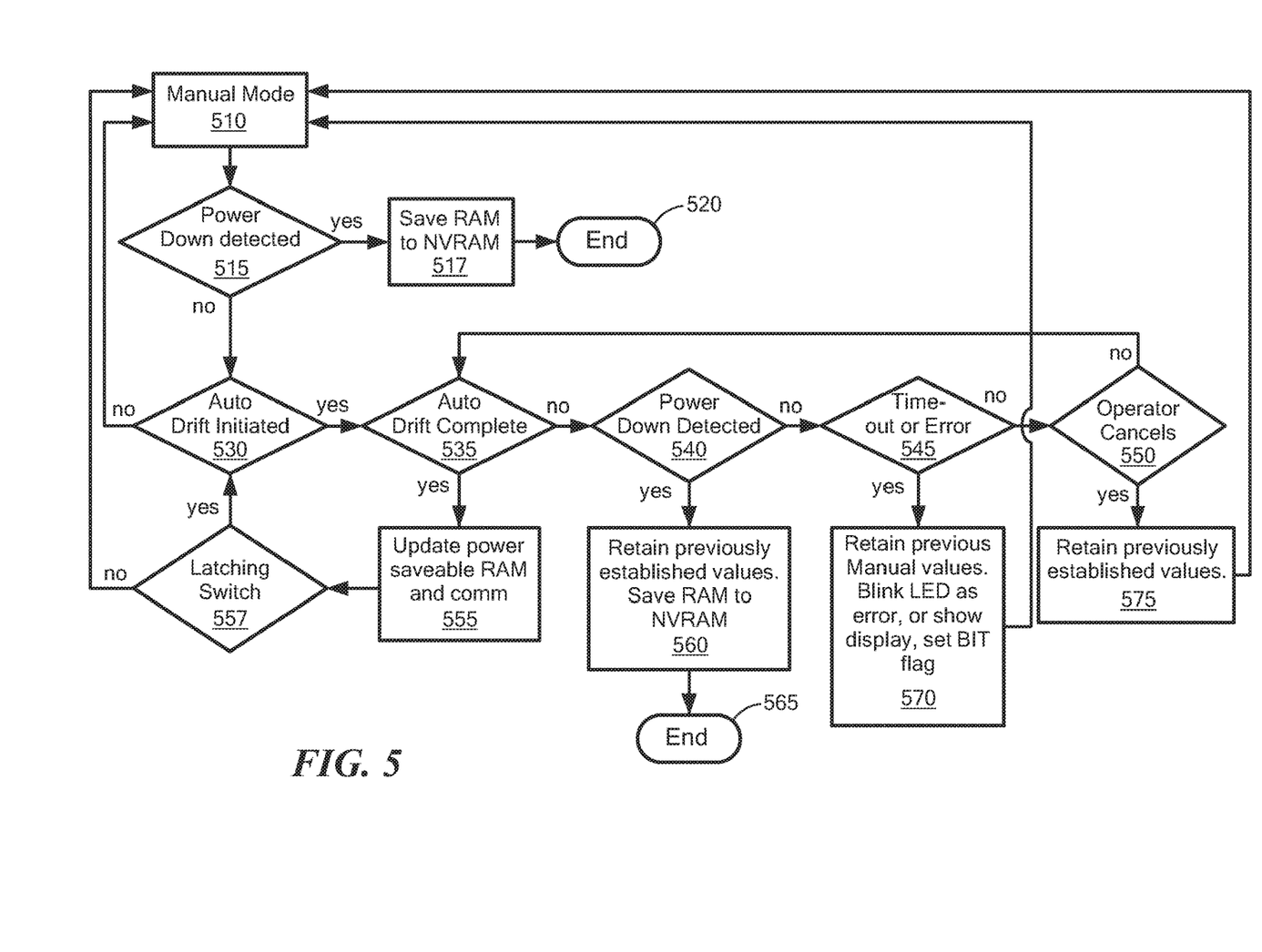
FIG. 5 is a flow diagram illustrating a process for switching between manual and automatic modes in accordance with described embodiments.

Referring to FIG. 5, a flow diagram illustrating a process for switching between manual and automatic modes in accordance with described embodiments is provided. After entering manual mode at block 510, a check at block 515 is performed to determine whether a system power signal indicates that power is being shut down. If power is set to shut down, settings including line of sight offsets presently within transitory memory (e.g., RAM 365) are saved to non-transitory memory (e.g., NVRAM 370) at block 517 and the system proceeds to shutdown at block 520.

With the system having power activated (no at block 515) and automatic drift correction mode initiated at block 530 via mode switch 330, the system will proceed to automatic mode at block 535 until complete. If automatic mode is not initiated, the system stays in manual mode at block 510 until automatic mode is initiated or the system is shut down. When automatic mode completes, at block 555 the system is updated (e.g., encoder values associated with control knobs 160 and 165 are saved to RAM 365) with the drift correction offsets at block 555 established during automatic mode. These updated drift correction offsets become the new values for any manual mode corrections. In an embodiment, when a "latching" mode is detected as being on/active at block 557 via mode switch 330, automatic mode continuously and automatically updates drift correction offsets until, for example, manual mode is activated by operator cancelation, an error occurs, or the system is shut down. If the latching mode is in active at block 557 the system reenters block 530 for automatic drift initiation.

When the automatic mode is determined to be incomplete at block 535, and if a shutdown signal is detected at block 540 during automatic mode, the system will revert to the last established (restored from RAM 365) values and save them to NVRAM 370 at block 560 prior to shutting down at block 565. If a shutdown or power down signal is not detected at block 540, and if a time-out or other error is detected in the system during automatic mode at block 545, the system will similarly revert to the last established values and signal the error to the operator via the indicator light 155, for example, at block 570 prior to reverting to manual mode at block 510. The operator can cancel automatic mode at block 550, such as by way of a switch 170 shown in FIGS. 1(a) and 1(b), which will signal the system to revert back to the last established values at block 575 prior to returning to manual mode.

Figure 6:
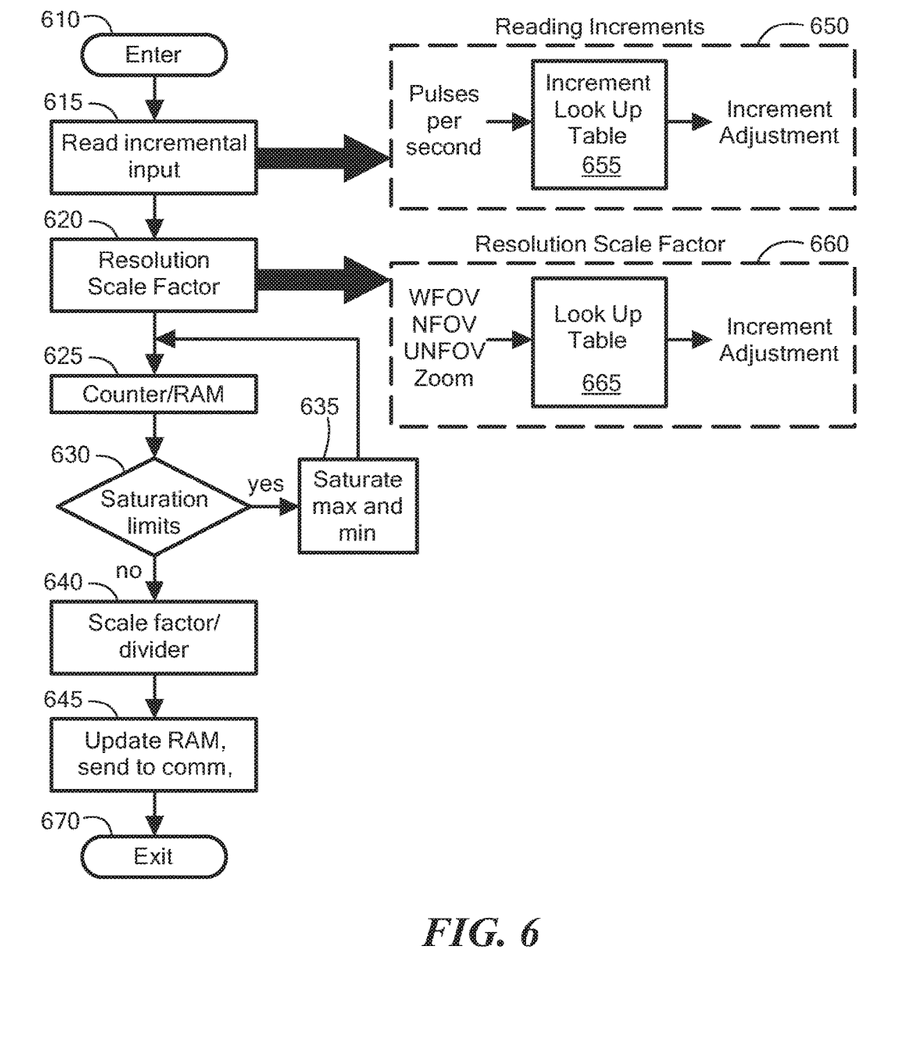
FIG. 6 is a flow diagram showing processing of digital input for a line of sight system in accordance with described embodiments.

Referring to FIG. 6, a flow diagram showing processing of digital input for a line of sight system in accordance with described embodiments is provided. In a manual (operator drift offset adjustment) mode initiated at block 610, incremental adjustments to drift offsets (e.g., azimuth and elevation drift offsets) are read (e.g., input using knobs 160, 165 or buttons 180, 185 such as shown in FIGS. 1(b)-1(c)) by the system at block 615. In an embodiment, the adjustment can be incremented at block 650 based on the frequency of the signal (e.g., tied to the speed of rotation of a knob) and a look-up table, or other transformation process represented at block 655, which translates the signal into digital increments. In an embodiment, an encoder is utilized to track the increments of a knob (e.g., pulses per revolution). For example, a relatively high count encoder of 1024 PPR (pulse per revolution) can be scaled down to a lower value of say 256 PPR. The increments are then processed according to a resolution scale factor at block 620. In an embodiment, the scale factor depends on a transformation represented at block 660 based on, for example, a particular field of view from block 340 (e.g., wide, near, zoomed) being used (e.g., based on sensor FOV settings/data established at block 340) and a corresponding transformation process (e.g., look-up table, algorithm) represented at block 665. In general, FOV transformation can be implemented using a variety of suitable techniques known to one of ordinary skill in the art so that each FOV can set different scale factor adjustments.

Once the digital input is processed based on reading increments and resolution scale factors, it is processed by a counter and stored in RAM 365 at block 625. In an embodiment, the azimuth and/or elevation offset values are further assessed for exceeding saturation limits at block 630 and, if the azimuth and/or elevation offset values do exceed the saturation limits, they can be set to predetermined minimum and maximum offset settings at block 635 before being further processed by the counter and again stored in RAM 365. The assessment of block 630 repeats until the azimuth and/or elevation offset values do not exceed the saturation limits.

In an embodiment, a predetermined system scale factor or divider is applied to the offset values at block 640 and updated in RAM 365 and/or communicated to subsystems at block 645 to be applied, for example, to offset the drift of an active line of sight. The drift offset adjustment is completed at block 670 and the process can begin again at block 610 upon further adjustments to offsets by an operator.

Embodiments of the invention can be implemented in any suitable arrangement of hardware, software, firmware, or any combination thereof. In embodiments, processing described herein may be implemented in computer programs executed on programmable computers/machines that each include a processor, a non-transitory machine-readable medium or other article of manufacture that is readable by the processor (including volatile and non-volatile memory and/or storage elements), at least one input device, and one or more output devices.

Figure 7:
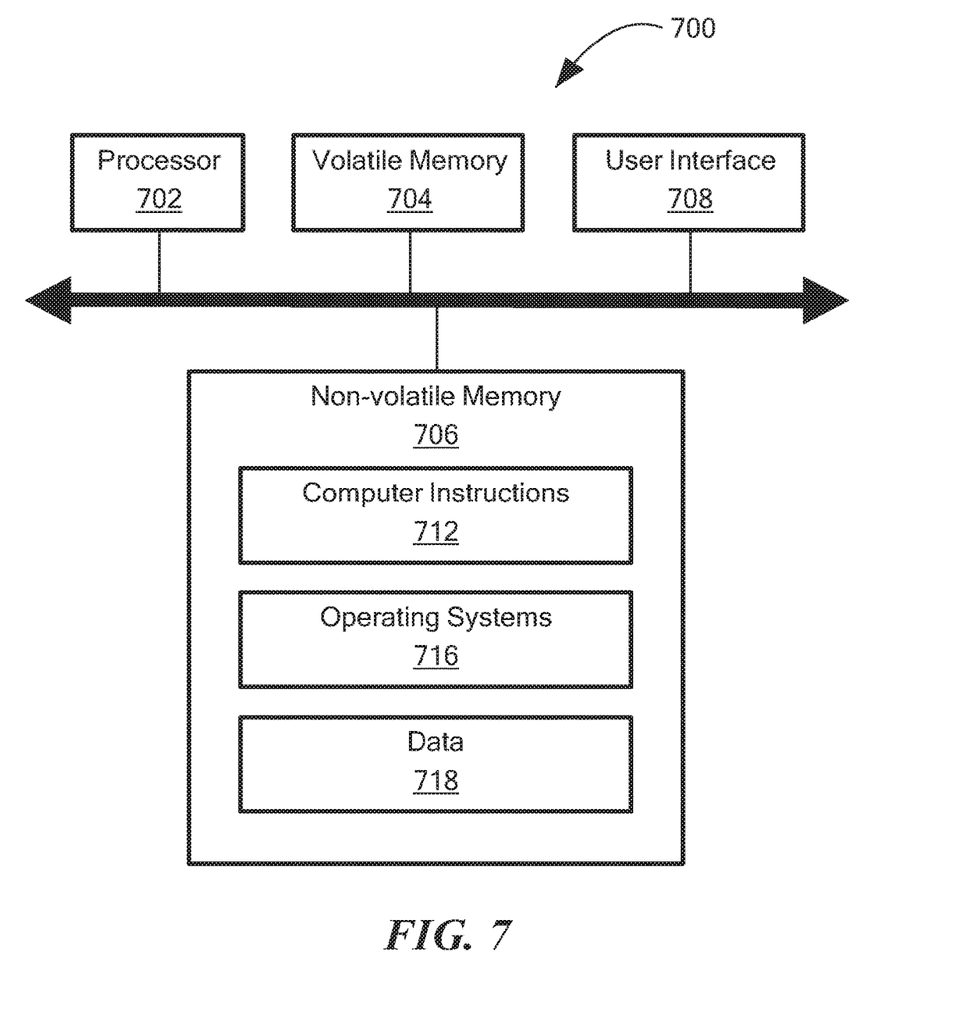
FIG. 7 is a an illustrative block diagram of a computer system for operating a line of sight system in accordance with described embodiments.

Referring to FIG. 7 an illustrative block diagram is provided of a computer that can form part of a system/controller for operating a line of sight system, such as the system shown in FIG. 3, in accordance with described embodiments. In an embodiment, a computer 700 includes a processor 702 e.g., digital processor 310 (FIG. 3), a volatile memory 704 e.g., RAM 365 (FIG. 3), a non-volatile memory 706, e.g., NVRAM 370 (FIG. 3) and a user interface (UI) 708 (e.g., control and indicator panel 150, 175 (FIG. 1(b), FIG. 1(c)), a graphical user interface, a mouse, a keyboard, a display, and/or touch screen). The non-volatile memory 706 stores computer instructions 712, an operating system 716 and data 718, such as the data described above. In one example, the computer instructions 712 are executed by the processor 702 out of volatile memory 704 to perform all or part of the processes described herein (e.g., processes illustrated in FIGS. 4, 5, and 6). In some embodiments, a portion of the processing is performed by computer 700 and other portions are performed by one or more circuits, which may operate in cooperation with the computer.

The processes described herein e.g., processes illustrated in FIGS. 4, 5, and 6) are not limited to use with the hardware and software of FIGS. 1, 3, and 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. In embodiments, the processor can include ASIC, FPGA, and/or other types of circuits. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes of FIGS. 4, 5, and 6 are not limited to the specific processing order illustrated. Rather, any of the processing blocks of FIGS. 4, 5, and 6 may be re-ordered, combined or removed, performed in parallel or in serial, as necessary, to achieve the results set forth above.

The processing blocks (for example, of FIGS. 4, 5, and 6) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to he construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to he directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to he transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts that have been described and illustrated herein might he made by those skilled in the art without departing from the scope of the following claims.

What is claimed is:

1. A system for adjusting a line of sight to a target in an image, the system comprising:
   an optical assembly having a field of view from which the image is generated;
   a display window for viewing a line of sight to the target in the image;
   a controller configured to operate in an automatic mode for automatically adjusting offsets to a drift in the line of sight to the target in the display window, and in a manual mode to receive operator adjustments to the offsets;

one or more first manual operator controls connected to a digital processor configured to adjust the offsets for the drift in the line of sight in the manual mode;

an operator control switch configured to switch the system between the automatic mode and the manual mode; and a mode indicator to indicate whether the automatic mode or manual mode is selected.

2. The system of claim 1 wherein the offsets are adjusted with digitally incremented values, the system further comprising second one or more manual operator controls configured for changing a scale of the digitally incremented values.

3. The system of claim 2 wherein the second one or more manual operator controls for changing the scale include one or more operator controls to adjust a portion of a FOV displayed as an image in the display window.

4. The system of claim 1 wherein the system reverts to the manual mode after the automatic mode completes an alignment of the line of sight.

5. The system of claim 1, wherein the system is further configured to detect errors or faults during adjustment of the offsets.

6. The system of claim 1 wherein the first one or more manual operator controls comprise azimuth and elevation offset controls.

7. The system of claim 1 wherein the first and second one or more manual operator controls comprise dials, push buttons, and/or joysticks.

8. The system of claim 1 further comprising optical configurations adapted for daytime and nighttime viewing.

9. The system of claim 1 further comprising a display status for the operator that includes range to the target.

10. The system of claim 1 further comprising non-volatile memory configured to store and restore the offsets.

11. A method for adjusting a line of sight to a target in an image, the method comprising:

providing a display window for viewing a line of sight to the target in the image;

providing first one or more manual operator controls connected to a digital processor configured to adjust offsets to the direction of the line of sight;

providing a manual mode of operation to enable the operator to adjust the offsets to the direction of the line of sight by manually adjusting the first one or more manual operator controls;

receiving user inputs to switch between the manual mode and an automatic mode configured to automatically correct for drift of the line of sight with the target in the image; and providing a mode indicator to indicate whether the automatic mode or manual mode is selected.

12. The method of claim 11 further providing second one or more manual operator controls for changing a scale of the offsets, the offsets adjusted with digitally incremented values.

13. The method of claim 11 wherein the first one or more manual operator controls comprise azimuth and elevation offset controls.

14. The method of claim 11 wherein the second one or more manual operator controls comprise controls for switching between a daytime view and a thermal imaging view.

15. The method of claim 11 wherein the second one or more manual operator controls comprise controls for saving and restoring saved offsets to the line of sight.

16. At least one non-transitory machine readable medium comprising instructions that, when executed by the machine, enable the machine to perform:

graphically rendering a line of sight to a target in an image in a display for viewing the image;

receiving incremental adjustments to digital offset values from the manual manipulation of operator controls and correspondingly offsetting a drift of the graphically rendered view of the line of sight to the target in the image;

receiving a signal that places the machine in an automatic mode to automatically adjust the offset values; and receiving a signal to switch from the automatic mode into a manual mode permitting manual manipulation of operator controls to manually adjust the offset values.

17. The machine readable medium of claim 16 further comprising instructions for:

receiving instructions for changing the scale of incremental adjustments to the digital offset values; and changing the scale of incremental adjustments to the digital offset values.

18. The machine-readable medium of claim 16 wherein the digital offset values comprise azimuth and elevation offsets to the drift of the line of sight to the scene.

19. The machine-readable medium of claim 16, further including instructions for adjusting a portion of a FOV displayed as an image in the display window.

20. The machine-readable medium of claim 16, wherein the system reverts to the manual mode after the automatic mode completes an alignment of the line of sight.

* * * * *